Patented May 9, 1939

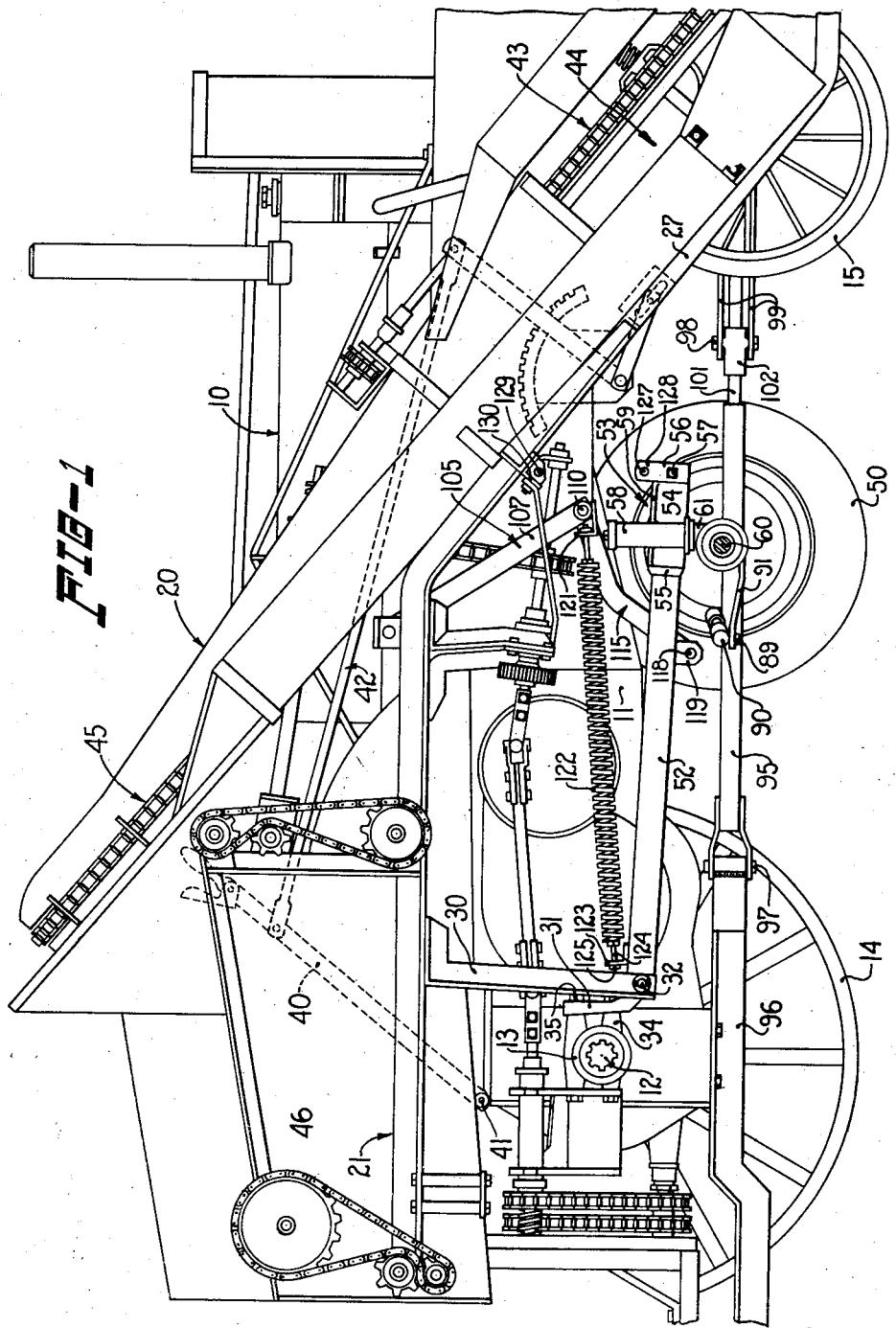

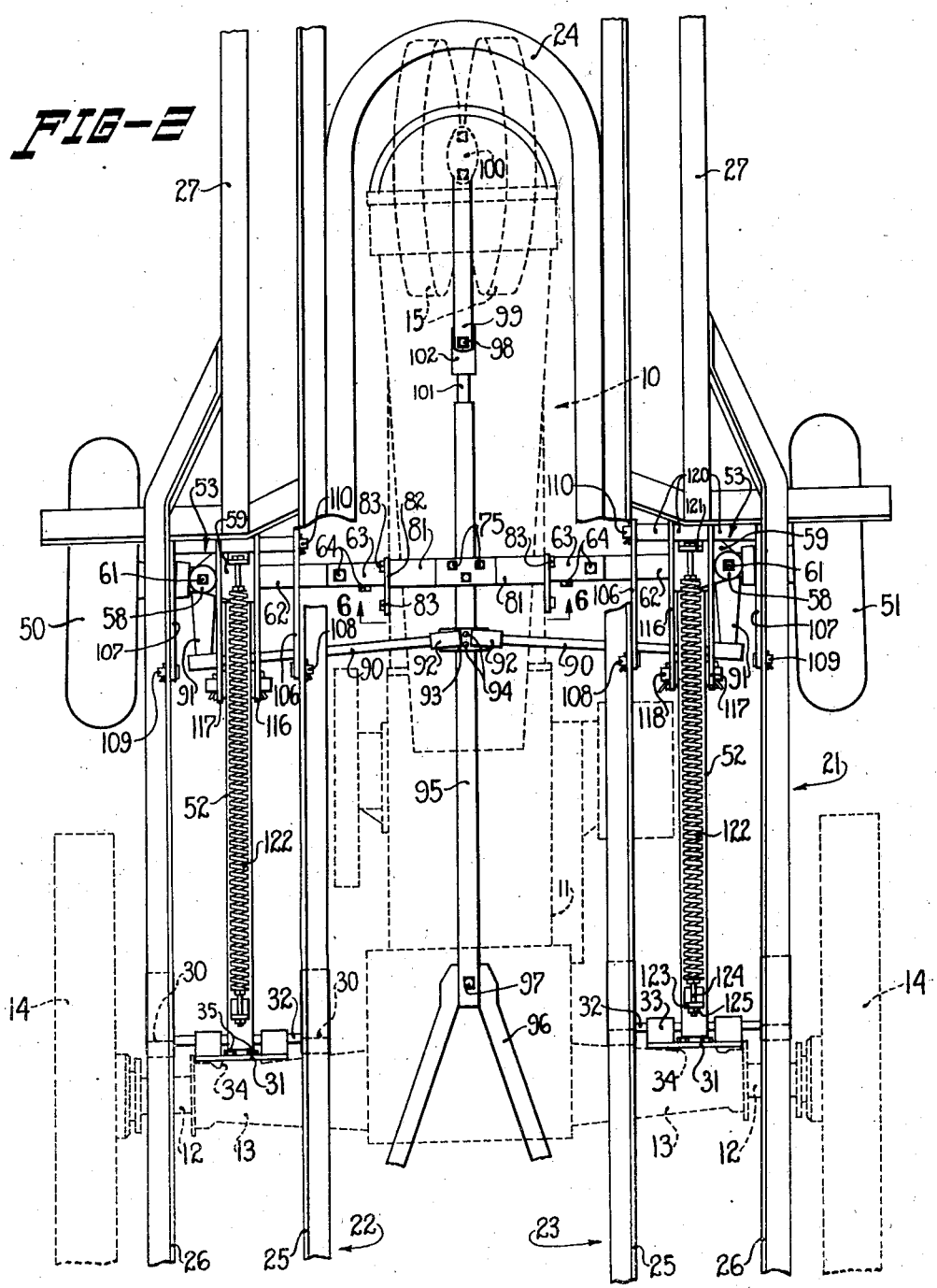

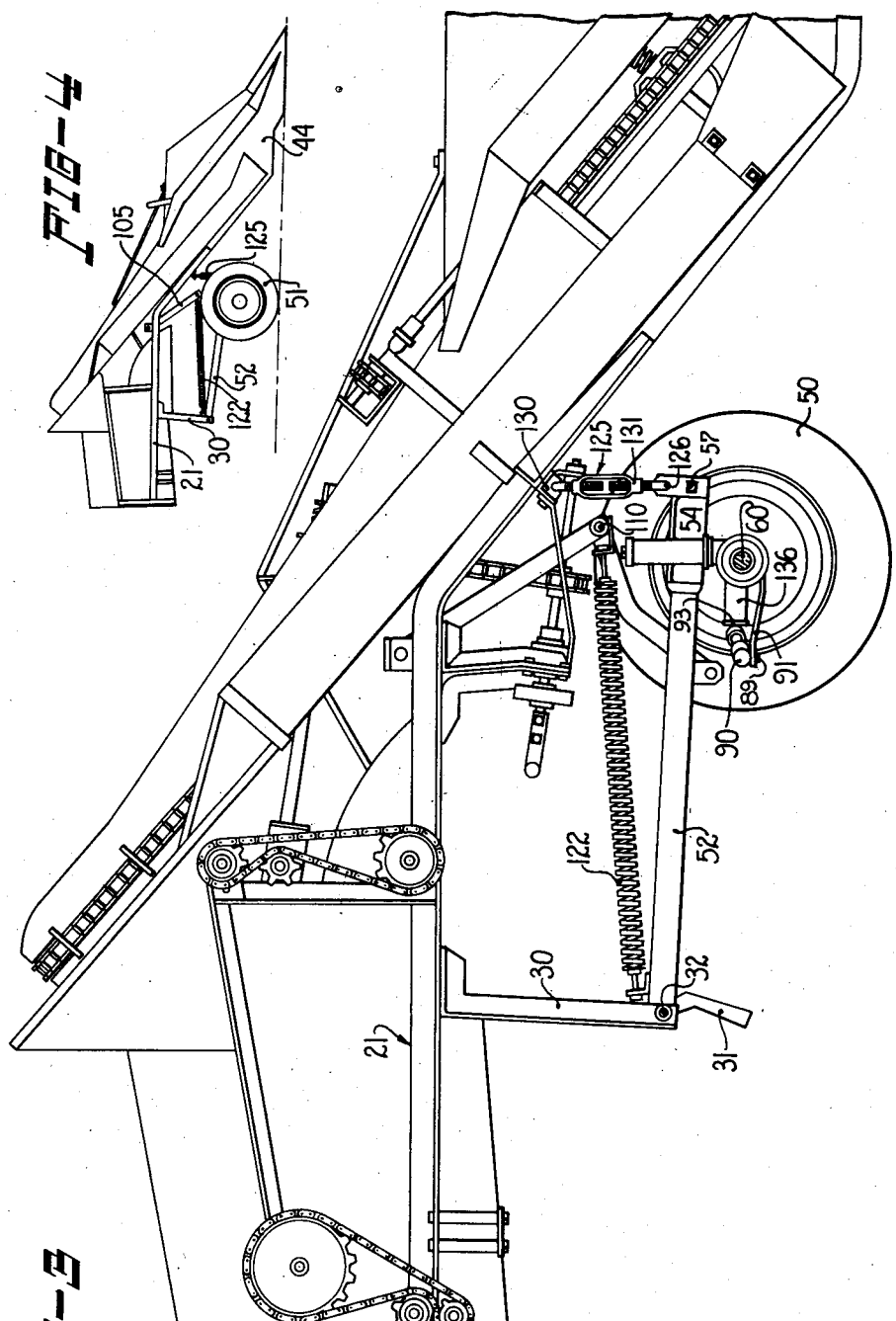

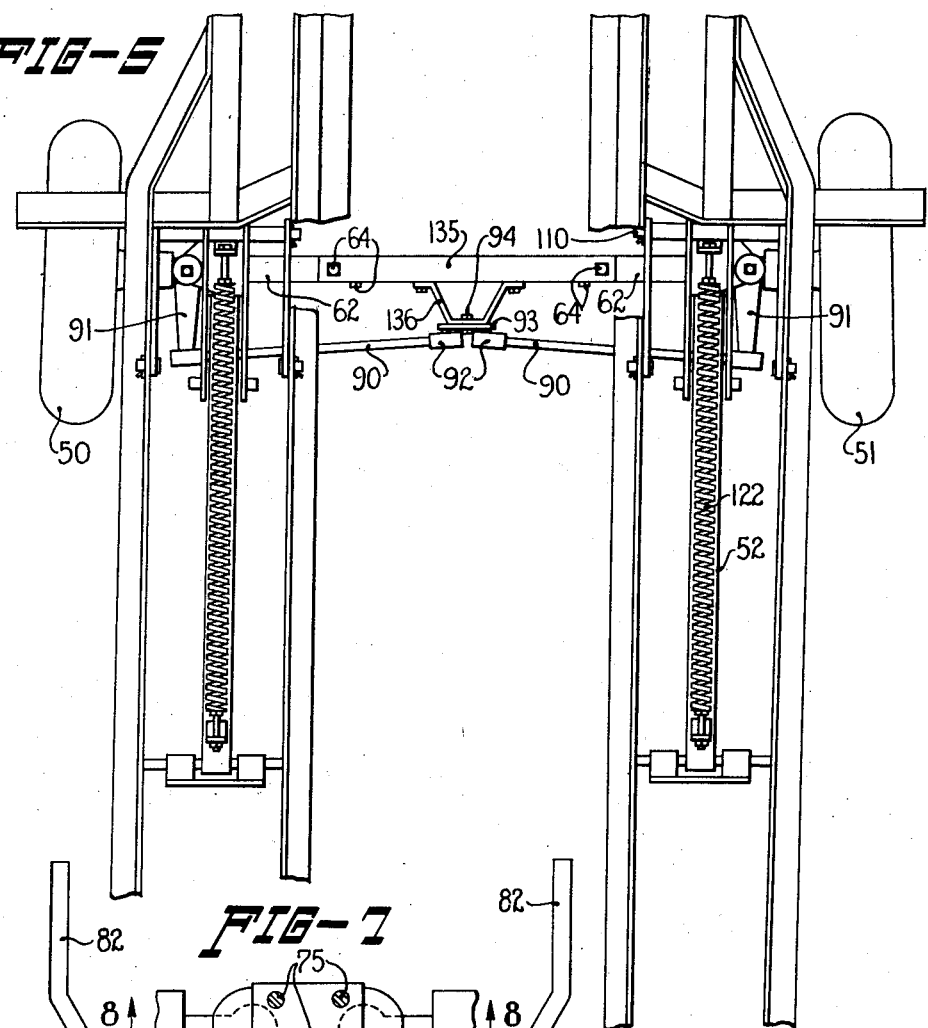
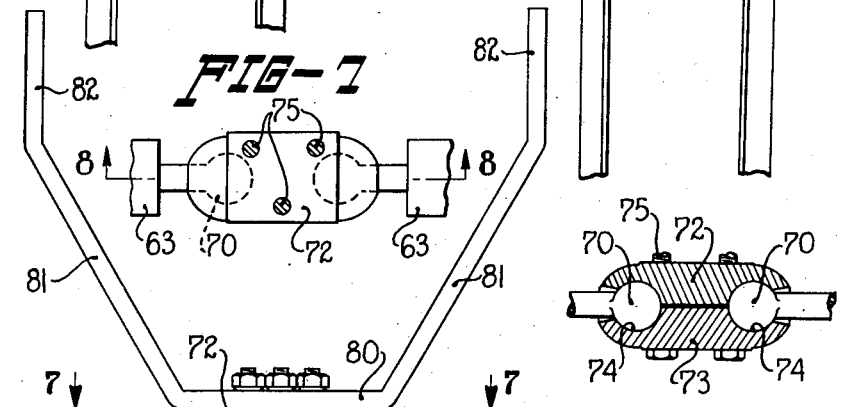
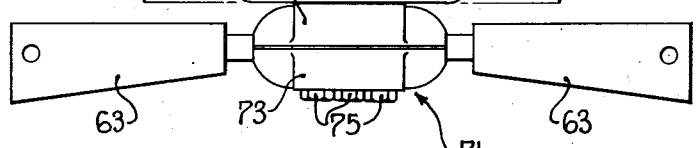

2,157,323

UNITED STATES PATENT OFFICE 2,157,323

TRACTOR MOUNTED IMPLEMENT

Wilbur J. Coultas, Moline, Ill., assignor to Deere & Company, Moline, Ill., a corporation of Illinois Application December 28, 1937, Serial No. 182,133

20 Claims. (Cl. 56—15)

The present invention relates generally to tractor mounted implements and more particularly to a novel supporting wheel connection for implements of the tractor mounted type, such as, for example, a tractor mounted corn picker. Specifically, my invention constitutes an improvement over the structure shown and described in an application by Alvin W. Oehler and Ralph L. Anderson, Serial No. 58,449, filed January 10, 1936.

Certain types of implements such as two-row corn pickers, which are adapted to be supported upon the tractor body in normally fixed relation thereto, impose such a heavy load upon the frame and wheels of the tractor that it is desirable to relieve a portion of this load by providing additional supporting wheels connected with the implement frame by linkage means providing vertical movement of the supporting wheel relative to the implement frame with loading springs acting through the supporting linkage to load a predetermined portion of the weight of the implement upon the additional supporting wheels. The above mentioned application shows one form of this device.

The effectiveness of the additional supporting wheels in relieving weight from the tractor, depends to a large extent upon the degree of flexibility afforded by the connecting linkages in order that these additional wheels may readily follow the irregular surface of the ground and at the same time exert a constant upward thrust against the frame of the implement.

The principal object of my invention, therefore, lies in the provision of an improved wheel mounting for additional supporting wheels of the type mentioned above, having inherently a great amount of flexibility and capable of following the irregular contour of the ground, and at the same time possessing the strength and ruggedness which is required in an implement of this class.

Another object relates to the provision of means for steering the additional supporting wheels responsive to the steering mechanism of the tractor.

A further object has to do with the provision of suitable bracing means which can be removably attached to the linkage connections of the additional supporting wheels and to the steering connections whereby the implement is adapted to rest on its own wheels when the tractor is removed from the implement frame, and whereby the implement can be moved about on its own wheels to facilitate handling for storage purposes and the like.

These and other objects and advantages will be made apparent by the following description of a specific embodiment of my invention, reference being had to the following drawings which are appended hereto and in which Figure 1 is a side elevation of a two-row tractor mounted corn picker embodying the principles of my invention. The rear traction wheel of the tractor is removed to show the details of my invention more clearly;

Figure 2 is a fragmentary plan view of the principal members of the frame of the corn picker shown in Figure 1, and showing the outline of a tractor in dotted lines;

Figure 3 is a side elevation showing the relative positions of the parts with the implement removed from the tractor;

Figure 4 is a side elevation of the implement drawn to a reduced scale, showing the implement supported on its own wheels when it is removed from the tractor;

Figure 5 is a fragmentary plan view of the implement frame and supporting wheels showing the bracing means for holding the linkage connections rigidly when the tractor is removed, to permit the implement to stand alone;

Figure 6 is an elevational view taken along a line 6—6 in Figure 2, showing a portion of the linkage connections;

Figure 7 is a detail view taken along a line 7—7 in Figure 6; and

Figure 8 is a sectional view taken along a line 8—8 in Figure 7, showing the details of the ball and socket joint.

Referring now to the drawings and more particularly to Figures 1 and 2, the tractor 10 comprises a longitudinally extending frame or body 11 supported at its rear end on driving axles 12 disposed within transversely extending axle housings 13 and carried on conventional traction wheels 14. The forward end of the frame is carried on closely spaced, centrally disposed dirigible wheels 15 of a conventional type.

Upon the tractor is mounted an implement 20, which is shown for purposes of description as a two-row corn picker, comprising a unitary structural frame 21 including a pair of longitudinal sections 22 and 23 disposed on opposite sides of the tractor body and extending parallel therewith and connected together at the forward end by a U-shaped frame member 24. Each of the longitudinal frame sections 22, 23 comprises inner and outer structural members 25 and 26, respectively, extending substantially horizontally from the rear of the tractor to points substantially midway between the front and rear wheels of the tractor where the frame sections 22, 23 incline downwardly toward the front wheel 15 of the tractor. The frame 21 is pivotally supported near its rear end on a pair of downwardly extending brackets 30, disposed on opposite sides of the tractor respectively and fixed to the bottom sides of beams 25, 26. The lower end of each bracket 30 is pivotally connected to a supporting member 31 by means of a transversely extending pivot bolt 32 which extends through aligned openings in the bracket 30 and in forwardly extending lugs 33 on the supporting member 31. The supporting member 31 is securely fixed to a boss 34 formed in the front surface of the axle housing 13, by means of bolts 35. Thus it can be seen that the frame 21 can be swung vertically about the pivot bolts 32 in order to raise and lower the forward end of the frame for the purpose of adjusting the latter relative to the ground.

Adjustment of the frame about the pivot bolt 32 is accomplished manually by means of suitable linkage 42 controlled by a hand lever 40 pivotally connected at 41 to the frame of the tractor. By means of this manual control mechanism, the implement frame can be adjustably fixed in any desired angular relation with respect to the tractor frame, whereby the implement and tractor move coadunatively as a unitary structure during operation. Supported on the downwardly and forwardly inclined portion 27 of the implement frame 21 are the usual gathering mechanisms 43, picking mechanisms 44, and conveyors 45, the details of which are not shown since they do not concern the present invention.

A housing 46 is supported at the rear of the frame 21, which housing contains conventional husking mechanism.

Coming now to that part of the structure with which my invention is more directly concerned, a pair of additional supporting wheels 50 and 51 are provided for relieving a portion of the weight of the implement from the tractor. The wheels 50 and 51 are disposed on opposite sides of the tractor substantially in line with the rear tractor wheels 14 and spaced longitudinally substantially midway between the front and rear tractor wheels. In Figure 1 the right-hand wheel 51 is removed to more clearly show the mechanism for connecting the wheels to the implement frame. Each of the wheels 50, 51 is carried at the forward end of a fore and aft extending arm 52 which is pivotally supported at its rear end on the pivot bolt 32, which supports the implement frame bracket 30. Each of the wheels 50 and 51 are mounted on the free end of its respective arm 52 by means of a wheel supporting member 53 comprising a sleeve 54 coaxially embracing the end of the arm 52, and secured against fore and aft movement by a collar 55 rigidly fixed, as by welding, to the arm 52 behind the sleeve 54, and a second collar 56 fixed to the arm 52 ahead of the sleeve 54 by means of a bolt 57 inserted through aligned openings in the collar 56 and the arm 52. Rigidly attached to the horizontally disposed sleeve 54 is a substantially vertically disposed sleeve 58. The two sleeves are secured together by means of a tie plate 59, which is welded to the top side of the sleeve 54 and to the intermediate portion of the vertical sleeve 58. The lower end of the sleeve 58 is joined with the lower side of the sleeve 54 by means of a beam member 62 extending laterally inward toward the tractor body. Sufficient clearance is provided between the inner ends of the members 62 on opposite sides of the tractor, to permit the tractor to be driven in and out of the implement frame at the rear end thereof.

Each of the wheels 50, 51 is journaled on a laterally extending stub axle 60 which is fixed to a vertically extending spindle 61 disposed rotatably within the vertical sleeve 58. Thus, each of the wheels is rotatable about the substantially vertical axis of the spindle 61 and is swingable about the generally horizontal axis of the arm 52 by virtue of the horizontal sleeve 54, and the wheel is vertically swingable with the arm 52 about the transverse pivot bolt 32. In order to brace the wheels 50, 51 against lateral movement relative to the tractor and to prevent the longitudinally extending arms 52 from being bent laterally, a pair of extensions 63 are provided for the members 62 and are rigidly fixed thereto by bolts 64. Thus, each member 62 with its extension 63, constitutes a transverse bracing arm which is rigidly fixed to the wheel supporting member 53 at one end, and is swingably connected to the tractor at its opposite end by means which are shown in more detail in Figures 6, 7 and 8.

Each of the inner ends of the extension arm 63 is provided with a ball member 70 which is held within a socket member 71 comprising a pair of upper and lower complementary members 72, 73. Members 72 and 73 are recessed to provide a pair of sockets 74 which cooperate with the balls 70 to form universal joints of the ball and socket type. The members 72 and 73 of the socket member 71 are held together by bolts 75 which extend beyond the member 71 through aligned openings in a vertically disposed U-shaped supporting bracket 80 having a pair of upwardly extending arms 81 terminating in a pair of vertically disposed connecting plates 82 which are securely fixed to the sides of the tractor by bolts 83. It is now evident that as the wheels 50 and 51 rise and fall over uneven ground, the longitudinal arms 52 swing vertically about the pivots 32 and the bracing arms 63 swing vertically in a transversely disposed plane about the ball and socket joints 70 and 71. During this vertical movement of the wheels 50, 51, there is a slight movement of the wheel supporting sleeve 54 about the axes of the arms 52, causing the wheel axles 60 to swing through a small angle above and below the horizontal. This slight swinging movement of the axles has no ill effect, however, on the operation of the wheels for it merely causes the wheels to roll from one side of the tread to the other.

The wheels 50 and 51 are steered by a pair of steering control rods 90 which are pivotally connected at their outer ends to a pair of rearwardly extending crank arms 91 by means of ball and socket joints 89. The crank arms 91 are rigidly fixed, as by welding, to the lower ends of the axle spindles 61, respectively. The inner ends of the control rods 90 are connected by ball and socket joints 92 to a tie plate 93, the latter being connected by bolts 94 to a beam 95 extending longitudinally beneath the tractor, which is pivotally connected at its rear end to a drawbar structure 96 by means of a vertical pivot bolt 97. The forward end of the beam has a section 101 of reduced diameter, which is slidably inserted into a sleeve 102. This sleeve 102 is secured by a vertical pivot bolt 98 between the upper and lower portions 99 of a rearwardly extending bifurcated lever fixed to the steering knuckle 100 of the tractor. Thus, by steering the front wheels of the tractor by the usual steering gear, the lever 99 is swung laterally in a horizontal plane causing the beam 95 to swing laterally about the pivot 97 and moving the control rods 90 laterally to swing the axle members about the vertical axes of the spindles 61 by means of the crank arms 91, causing the additional supporting wheels 50 and 51 to be guided in the direction of turning of the tractor along with the front wheels 15. During vertical movement of the wheels 50 and 51 as they pass over uneven ground, the steering control rods 90 swing vertically about the ball and socket joints 92 without interfering with the steering control.

In order to load a portion of the weight of the implement frame upon the additional supporting wheels 50 and 51, spring means is provided for applying a downward force upon the wheels and reacting upwardly against the implement frame. To this end a toggle mechanism is connected between the implement frame 21 and each of the vertically swingable wheels 50 and 51. Such toggle mechanism comprises an upper toggle link, indicated in its entirety by the reference numeral 105, and comprising a laterally rigid structure made up of two laterally spaced bars 106, 107. The bars 106, 107 are pivotally connected at their upper ends to the frame members 25, 26, respectively, by pivot pins 108, 109. The lower ends of the bars 106, 107 are apertured to receive a transversely extending pivot pin 110 to which the upper end of a lower pivot link, indicated in its entirety in Figure 1 by the reference numeral 115, is connected. The toggle link member 115, like the link member 105, also comprises two bars 116, 117, the upper ends of which are apertured to receive the pivot pin 110, and the lower ends of which are pivoted, as by pin 118, to a bracket 119 fixed to the longitudinal arm 52 as by welding. The proper lateral spacing of the bars 106, 107, 116, 117 on the pivot pin 110, is maintained by means of spacing sleeves 120 embracing the pin 110 between the bars of the toggle links.

An angle clip 121 is welded to the center one of the spacing sleeves 120, and to the clip is bolted a loading spring 122 which extends rearwardly above the arm 52 to a lug 123 which is welded to the arm 52 near the rear end thereof. The rear end of the spring 122 is secured to a threaded rod 124 which extends through an aperture in the lug 123 and is secured by a nut 125. The tension in the spring 122 is adjusted by adjusting the nut 125 on the rod 124. By adjusting the tension in the spring, the force exerted thereby through the toggle links 105, 115 may be varied and thus the proportion of the weight of the implement frame which is carried upon the additional supporting wheels, may be controlled. The angular relation between the toggle links 105, 115, is proportioned to the length of the loading spring 122 substantially as shown, so that a substantially constant pressure is exerted through the links upon the wheels regardless of the vertical position of the latter. Although the tension in the spring is decreased when the wheel drops into a depression, due to contraction of the spring, the toggle links approach a more nearly dead center relation, in which the predetermined pressure upon the wheels is maintained with a smaller value of tension in the spring 122. I have found that the wheel supporting mechanism described herein provides a sturdy and rugged support for the wheels while permitting great flexibility of movement between the wheels and the implement frame in order to maintain at all times the additional support for the frame for which they were intended.

Mention has been made hereinbefore of the fact that the implement can be disconnected from the tractor after which the tractor may be backed out of the implement frame, leaving the implement resting upon its own wheels. However, since the implement wheels 50 and 51 are movably connected to the arms 52, it is desirable that they be fastened rigidly with respect to the implement frame when the tractor is removed, in order that the implement may then be moved about by hand. In order to hold the wheels against vertical movement relative to the implement frame, the ends of the longitudinal arms 52 are fixedly connected to the frame by means of braces 125, the lower end of each brace being provided with a hook 126 adapted to be inserted through an aperture 127 in an upwardly extending ear 128 of the collar 56; the upper end being turned at right angles and adapted to be inserted through an aperture 129 in a bracket 130 fixed to the lower side of the implement frame. The bracket 125 includes a turnbuckle 131 to permit the length of the bracket to be adjusted to different distances between the apertures 127 and 129 since this distance varies with the tension in the spring 122. It is desirable that one of these braces 125 be installed on each of the arms 52 before the tractor is removed from the implement.

The supporting members 31 holding the rear portion of the implement frame 21, may then be disconnected from the rear axle housings by removing the bolts 35. The U-shaped bracket 82 is then removed from the tractor by removing the bolts 83, and the extension arms 63 are detached from the laterally extending members 62 by removing the bolts 64, after which the structure shown in Figure 6 can be withdrawn as a unit. The steering connections are disconnected from the steering control beam 95 by removing the bolts 94 which hold the plate 93 on the beam 95. One of the ball and socket connections 92 should also be disconnected to permit the control rods 90 to be swung rearwardly to allow the passage of the front wheels of the tractor. It is desirable that a block be placed under each of the laterally extending members 62 to prevent the wheels from buckling by virtue of the sleeves 54 being rotatable upon the arms 52. After certain other connections between the implement and the tractor, which are well known to those familiar with this type of machine, have been disconnected, the tractor may then be backed out of the implement frame.

In order to hold the wheels against lateral tilting, the extension arms 63 with their ball and socket joint members 71, are replaced by a transverse brace bar 135 which is bolted at either end to the inner ends of the inwardly extending members 62 by means of the bolts 64. The blocks which were temporarily placed under the member 62, may now be removed, as the wheel supporting members are interconnected by means of the brace 135, to form a rigid structure. The ball and socket joint 92 which was disconnected to provide passage for the front tractor wheels, may now be reconnected and the connecting plate 93 is bolted by means of the bolts 94 to a U-shaped bracket 136 secured to the side of the transverse brace bar 135. The supporting wheels 50 and 51 are thus secured in fixed parallel relation with the implement frame and the implement is now resting upon its own wheels while the front ends of the gathering units 44 support the forward end of the frame upon the ground. Since the center of gravity of the implement when removed from the tractor is slightly ahead of the supporting wheels, the implement is stable in this position.

An alternative connection for the wheel supporting members when the implement is being installed upon the tractor, is to use the transverse brace bar 135 to connect the two laterally extending members during operation instead of replacing the brace bar with the extensions 63 and ball and socket joint 71. Thus the two wheel supporting members are interconnected at all times by means of the brace bar 135, the latter being removed only temporarily to back the tractor out of the implement. This alternative connection, while reducing the number of parts required, does not brace the wheels 50, 51 against lateral movement quite as well as does the attachment shown in Figure 6, which acts directly between each of the wheel supports and the tractor itself. Hence the latter is preferable.

In using the alternative connection, the bar 135 is positioned as shown in Figure 5 and will extend between the members 62 over the longitudinal steering beam 95. The steering rods 90 should, of course, be disconnected from the bracket 136 and reconnected to the beam 95 as in Figures 1 and 2. The bracket 136 should be unbolted from the brace bar 135 during operation, to avoid possible interference with the rods 90.

Although a tractor mounted corn picker is used for purposes of description and explanation of the principles of my invention, I do not intend my invention to be limited to this particular application, nor to the details shown and described herein except as limited by the following claims.

I claim:

1. In combination, a wheel supported frame, an attachment frame supported thereon, an additional supporting wheel, an axle therefor, means connecting said axle to one of said frames providing for vertical movement relative thereto, means acting downwardly on said wheel and reacting upwardly on one of said frames for determining the proportion of weight supported on said wheel, a bracing member connected to said wheel and extending generally axially therefrom, and means for swingably connecting said bracing member to one of said frames.

2. In combination, a wheel supported vehicle frame, an attachment frame supported thereon in normally fixed relation thereto, an additional supporting wheel, an axle for said wheel, link means for connecting said axle to one of said frames providing for vertical movement of said wheel relative to said frames, yielding means acting downwardly upon said wheel and reacting upwardly upon one of said frames for determining the load carried by said wheel, a bracing member connected to said axle and extending generally parallel thereto, and means for swingably connecting said bracing member to one of said frames.

3. In combination, a vehicle frame having front and rear supporting wheels, an attachment frame supported thereon in normally fixed relation thereto, a pair of additional supporting wheels disposed on opposite sides of the vehicle, respectively, link means connecting said wheels to one of said frames and providing for independent vertical movement of each of said wheels relative to the frame, spring means for loading a portion of the weight of said frames on said additional wheels, and lateral bracing means for said wheels comprising transversely extending members connected to said wheels, respectively, and pivotally connected to one of said frames.

4. In combination with a tractor having a frame, an implement comprising a frame supported on said tractor in normally fixed relation thereto, an additional supporting wheel for said implement, means connecting said wheel to said implement frame providing for relative vertical movement with respect thereto, spring means for loading a portion of the weight of said implement frame on said wheel, and means for bracing said wheel against lateral movement comprising a transversely extending bracing member attached to said wheel and pivotally connected to one of said frames to permit said vertical movement of the wheel.

5. In combination with a tractor having a frame, an implement comprising a frame supported on said tractor in normally fixed relation thereto, an additional supporting wheel for said implement, means connecting said wheel to said implement frame providing for relative vertical movement with respect thereto, spring means for loading a portion of the weight of said implement frame on said wheel, and means for bracing said wheel against lateral movement comprising a bracing arm attached to said wheel and extending generally axially thereof and having a ball and socket connection with said tractor frame.

6. In combination with a tractor having a frame, an implement comprising a frame supported on said tractor in normally fixed relation thereto, an additional supporting wheel for said implement, means connecting said wheel to said implement frame providing for relative vertical movement with respect thereto, spring means for loading a portion of the weight of said implement frame on said wheel, and means for bracing said wheel against lateral movement comprising a bracing arm attached to said wheel and extending generally perpendicular to the plane of vertical movement of the wheel, a bracket fixed to said tractor frame, and a ball and socket connection between said bracket and said arm.

7. In combination with a wheel-supported vehicle frame, an attachment frame secured thereto and movable coadunatively therewith, an arm pivotally connected to one of said frames for vertical swinging movement relative thereto and extending generally longitudinally of said vehicle frame, a wheel supporting member attached to the free end of said arm, a second arm attached to said member and disposed substantially transversely of said vehicle frame, means for swingably connecting said second arm to one of said frames, a ground wheel journaled on said member, and means for loading at least a portion of the weight of said attachment frame on said wheel.

8. In combination with a tractor, an implement comprising a frame supported on said tractor and normally fixed relative thereto, a fore and aft extending arm pivotally supported at one end on the tractor for vertical swinging movement, a wheel supporting member secured to the free end of said arm, a ground wheel journaled on said member, a transversely extending bracing member attached to said wheel supporting member at one end thereof, means for swingably connecting said bracing member to said tractor at its opposite end for accommodating the vertical swinging of the wheel on the first said arm while bracing the latter against lateral movement, and means acting downwardly on said wheel supporting member and reacting upwardly on said implement frame for determining the weight carried on said wheel.

9. In combination with a wheel supported vehicle frame, an attachment frame fixed thereto and movable coadunatively therewith, a fore and aft extending arm pivotally connected to one of said frames for vertical swinging movement, a wheel supporting member including a laterally extending axle connected to the free end of said arm and swingable in a transverse vertical plane relative to said arm, a ground wheel journaled on said axle, a bracing member fixed to said wheel supporting member and extending substantially transversely of said vehicle frame, means for swingably connecting said bracing member to one of said frames to accommodate swinging movement of said arm while bracing the latter against lateral movement, and yieldable means acting downwardly against said wheel supporting member and reacting upwardly against said attachment frame for determining the weight carried by said wheel.

10. In combination with a wheel supported vehicle frame, an attachment frame fixed thereto and movable coadunatively therewith, a fore and aft extending arm pivotally connected to one of said frames for vertical swinging movement, a wheel supporting member including a laterally extending axle connected to the free end of said arm and swingable about a generally vertical axis relative to said arm, a ground wheel journaled on said axle, a bracing member connected to said wheel supporting member and extending substantially transversely of said vehicle frame, means for swingably connecting said bracing member to one of said frames to accommodate swinging movement of said arm while bracing the later against lateral movement, and yieldable means acting downwardly against said wheel supporting member and reacting upwardly against said attachment frame for determining the weight carried by said wheel.

11. In combination with a wheel supported vehicle frame, an attachment frame fixed thereto and movable coadunatively therewith, a fore and aft extending arm pivotally connected to one of said frames for vertical swinging movement, a wheel supporting member including a laterally extending axle connected to the free end of said arm, said axle being swingable relative to said arm in a vertical plane and also about a generally vertical pivot, a bracing member connected to said fore and aft extending arm and swingably attached to said vehicle frame to brace said arm against lateral movement, and spring means for loading a portion of the weight of said attachment frame on said ground wheel.

12. In combination with a tractor having a frame supported on front and rear wheels, an implement frame supported on said tractor and normally fixed relative thereto, a fore and aft extending arm pivotally connected to said tractor for vertical swinging movement, a wheel supporting member journaled on said arm for swinging movement in a generally transverse vertical plane, a bracing arm fixed to said member, universal joint means for connecting said bracing member to said tractor providing for vertical swinging movement of said arms, an axle member pivotally connected to said wheel supporting member for horizontal swinging movement relative thereto and including a laterally extending stub axle, a ground wheel journaled on said axle, means for steering said wheel, and means for loading a share of the weight of said implement frame on said ground wheel.

13. In combination with a tractor having a frame supported on dirigible wheels, an implement frame supported on said tractor and normally fixed relative thereto, a pair of longitudinally extending arms, one on each side of the tractor and pivotally connected to the latter for vertical swinging movement, a wheel supporting member attached to each of said arms, each of said members including a stub axle swingable in a generally horizontal plane relative to said arm and a bell crank attached to said stub axle, a ground wheel journaled on each of said stub axles, a steering lever pivotally connected to the tractor for lateral swinging movement and connected with said dirigible wheels to swing responsive to steering control of the latter, steering rods pivotally connected to said bell cranks, respectively, each of said rods having a universal joint connection with said steering lever, a bracket mounted on said tractor, a pair of bracing arms connected to said longitudinal arms, respectively, universal joint means for connecting said bracing arms to said bracket, a ground wheel journaled on each of said stub axles, and spring means acting between said longitudinal arms and said implement frame for determining the amount of weight carried by said ground wheels.

14. In combination with a tractor having a wheel supported frame, an implement attachment frame removably supported on said tractor and normally fixed relative thereto during operation, a pair of longitudinally extending arms, one on each side of said tractor and pivotally connected to the implement frame for vertical swinging movement, a wheel supporting member mounted on each of said arms and including axle means, a ground wheel journaled on each of said axle means, spring means for supporting said implement frame on said ground wheels, and a removable brace adapted to be connected transversely between the two arms when the implement is removed from the tractor, to secure the wheels in predetermined lateral spacing relative to each other to permit the implement frame to rest securely upon its own wheels.

15. In combination with a tractor having a wheel supported frame, an implement attachment frame removably supported on said tractor and normally fixed relative thereto during operation, a pair of longitudinally extending arms, one on each side of said tractor and pivotally connected to the implement frame for vertical swinging movement, a wheel supporting member mounted on each of said arms and including axle means, a ground wheel journaled on each of said axle means, spring means for supporting said implement frame on said ground wheels, a removable brace adapted to be connected transversely between the two arms when the implement is removed from the tractor, to secure the wheels in predetermined lateral spacing relative to each other to permit the implement frame to rest securely upon its own wheels, and detachable means for holding said arms in fixed vertical position relative to the implement frame during and after removal of the latter from the tractor.

16. In combination with a tractor having a frame supported on dirigible wheels, an implement frame supported on said tractor and normally fixed relative thereto, a pair of longitudinally extending arms, one on each side of the tractor and pivotally connected to the latter for vertical swinging movement, a wheel supporting member attached to each of said arms, each of said members including a stub axle swingable in a generally horizontal plane relative to said arm and a bell crank attached to said stub axle, a ground wheel journaled on each of said stub axles, steering rods pivotally connected to said bell cranks, respectively, each of said rods having means adapted for connection with the tractor steering control mechanism, and a removable brace adapted to be connected transversely between the two arms when the implement is removed from the tractor to secure the wheels in proper lateral spacing relative to each other to permit the implement frame to rest securely upon its own wheels, said brace having means for securing each of said steering rods thereto to fix said ground wheels in predetermined position.

17. In combination with a tractor having a frame supported on dirigible wheels, an implement frame supported on said tractor and normally fixed relative thereto, a pair of longitudinally extending arms, one on each side of the tractor and pivotally connected to the latter for vertical swinging movement, a wheel supporting member attached to each of said arms, each of said members including a stub axle swingable in a generally horizontal plane relative to said arm and a bell crank attached to said stub axle, a ground wheel journaled on each of said stub axles, steering rods pivotally connected to said bell cranks, respectively, each of said rods having means adapted for connection with the tractor steering control mechanism, a removable brace adapted to be connected transversely between the two arms when the implement is removed from the tractor to secure the wheels in proper lateral spacing relative to each other to permit the implement frame to rest securely upon its own wheels, said brace having means for securing each of said steering rods thereto to fix said ground wheels in predetermined position, and detachable bracing members adapted for connection between said arms and said implement frame for holding said arms in fixed vertical position relative to the implement frame during and after removal of the latter from the tractor.

18. In combination, a wheel supported frame, an attachment frame supported thereon, an additional supporting wheel, an axle therefor, means connecting said axle to one of said frames providing for vertical movement relative thereto, means acting downwardly on said wheel and reacting upwardly on one of said frames for determining the proportion of weight supported on said wheel, a bracing member connected near one end thereof to said wheel and extending generally axially therefrom, and means near the opposite end thereof for supporting said bracing member while permitting movement of the latter in a vertical plane.

19. In combination, a tractor, an implement frame associated with the tractor to move coadunatively therewith, an additional supporting wheel for said implement, a wheel supporting member on which said wheel is mounted, means connecting said member to said implement frame providing for vertical movement relative thereto, yielding means acting downwardly on said supporting member and upwardly on one of said frames, and means for resisting the tendency of said wheel to tilt laterally comprising a transversely extending member connected at one end to said wheel supporting member, and means for supporting the opposite end of said transversely extending member.

20. In combination with a tractor, an implement frame removably supported on said tractor and normally fixed relative thereto during operation, a pair of longitudinally extending arms, one on each side of the tractor and pivotally connected thereto for vertical swinging movement, a wheel supporting member mounted on each of said arms and including axle means, a ground wheel journaled on each of said axle means, spring means for supporting said implement frame on said ground wheels, and a transversely extending bracing member connected between said wheel supporting members.

WILBUR J. COULTAS.